(12) United States Patent
Arnould et al.

(10) Patent No.: US 8,791,611 B2
(45) Date of Patent: Jul. 29, 2014

(54) DEVICE FOR THE CONTACT AND ATTACHMENT OF AN ELECTRIC COMPONENT IN A MOTOR VEHICLE

(75) Inventors: Robert Arnould, Sardon (FR); David Marchand, Vibraye (FR)

(73) Assignee: Johnson Controls Technology Company, Holland, MI (US)

(*) Notice: Subject to any disclaimer, the term of this patent is extended or adjusted under 35 U.S.C. 154(b) by 755 days.

(21) Appl. No.: 12/594,324

(22) PCT Filed: Apr. 2, 2008

(86) PCT No.: PCT/EP2008/002631
§ 371 (c)(1),
(2), (4) Date: Jul. 14, 2010

(87) PCT Pub. No.: WO2008/119561
PCT Pub. Date: Oct. 9, 2008

(65) Prior Publication Data
US 2010/0277018 A1      Nov. 4, 2010

(30) Foreign Application Priority Data

Apr. 2, 2007  (DE) .......................... 10 2007 016 166

(51) Int. Cl.
*H02K 11/00* (2006.01)
*H02K 5/22* (2006.01)
*H01R 4/26* (2006.01)
*H01R 4/28* (2006.01)
*H01R 13/62* (2006.01)
*H01R 13/625* (2006.01)

(52) U.S. Cl.
CPC .. *H02K 5/22* (2013.01); *H01R 4/26* (2013.01); *H01R 4/28* (2013.01); *H01R 13/62* (2013.01); *H01R 13/625* (2013.01)
USPC ............. 310/71; 439/332; 439/345; 439/404; 439/426; 439/537; 439/858

(58) Field of Classification Search
CPC ............ H01R 4/26; H01R 4/28; H01R 13/62; H01R 13/625; H02K 5/22
USPC ............. 310/71; 439/332, 345, 404, 426, 858, 439/537
IPC ...................................................... H02K 11/00
See application file for complete search history.

(56) References Cited

U.S. PATENT DOCUMENTS 2,110,133 A * 3/1938 Douglas ........................ 362/651
3,503,032 A * 3/1970 Routh et al. .................... 439/94

(Continued)

FOREIGN PATENT DOCUMENTS

DE    29603747 U1    5/1996
DE    10144549       1/2003

(Continued)

OTHER PUBLICATIONS

European Examination Report mailed Jan. 29, 2013.

*Primary Examiner* — John K Kim
(74) *Attorney, Agent, or Firm* — Fletcher Yoder, P.C.

(57) ABSTRACT

A device is provided for contact and attachment of an electrical component, such as in a motor vehicle. The contact and attachment are in a substantially flat region of a support element. The device comprises a plurality of clips. One side of the clips being configured to be at least partially inserted into at least one recess in the support element.

8 Claims, 3 Drawing Sheets

(56) References Cited

U.S. PATENT DOCUMENTS

Figure 3:
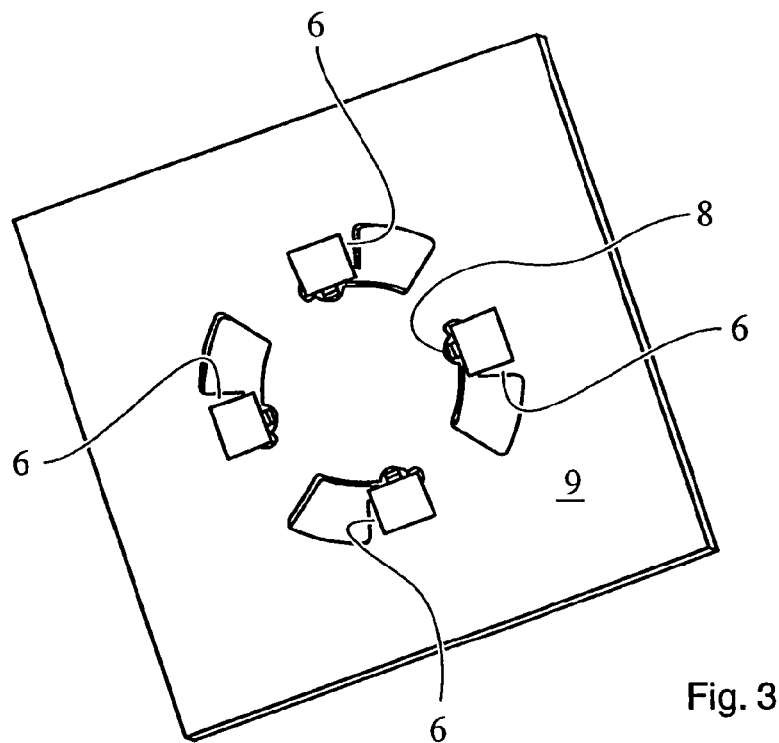

| | | | |
|---|---|---|---|
| 3,511,982 A * | 5/1970 | Salter | 362/382 |
| 3,551,713 A * | 12/1970 | White | 310/71 |
| 3,589,660 A * | 6/1971 | Dunckel | 248/343 |
| 4,029,384 A * | 6/1977 | Reinwall, Jr. | 439/397 |
| 4,323,215 A * | 4/1982 | Berger | 248/544 |
| 4,645,286 A * | 2/1987 | Isban et al. | 439/571 |
| 4,645,289 A * | 2/1987 | Isban | 439/101 |
| 5,242,314 A * | 9/1993 | Di Giulio et al. | 439/404 |
| 5,759,049 A * | 6/1998 | Gerber | 439/74 |
| 5,888,076 A * | 3/1999 | Itoh et al. | 439/74 |
| 5,980,268 A * | 11/1999 | Mischenko et al. | 439/66 |
| 6,144,127 A * | 11/2000 | Heise | 310/71 |
| 6,190,198 B1 * | 2/2001 | Ray | 439/532 |
| 6,328,575 B1 * | 12/2001 | Burrell | 439/74 |
| 6,346,000 B1 * | 2/2002 | Orr | 439/342 |
| 7,052,317 B2 * | 5/2006 | Hara et al. | 439/567 |
| 2004/0033708 A1 * | 2/2004 | Joseph et al. | 439/110 |
| 2006/0094294 A1 * | 5/2006 | Blickle | 439/544 |
| 2008/0254688 A1 * | 10/2008 | Bogursky et al. | 439/858 |
| 2009/0040765 A1 * | 2/2009 | Van De Voorde | 362/294 |
| 2009/0181562 A1 * | 7/2009 | Croy et al. | 439/83 |
| 2010/0277018 A1 * | 11/2010 | Arnould et al. | 310/71 |

FOREIGN PATENT DOCUMENTS

| | | |
|---|---|---|
| DE | 102005046545 | 5/2006 |
| EP | 0330566 A1 | 8/1989 |
| EP | 0457525 A1 | 11/1991 |
| WO | 2005071802 A1 | 8/2005 |

* cited by examiner

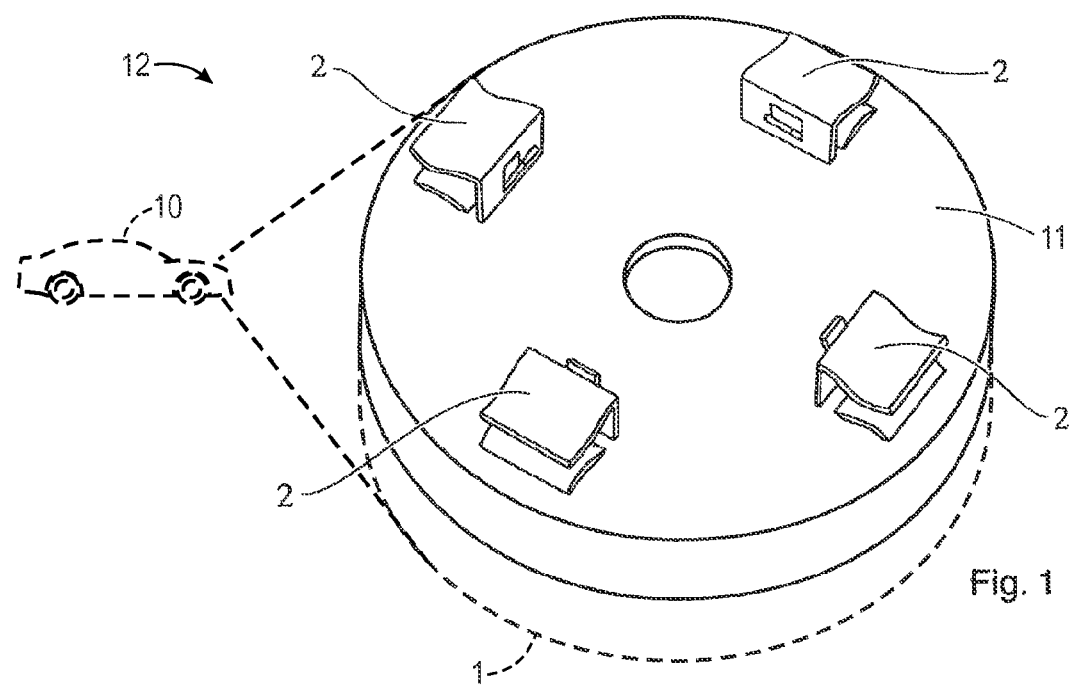
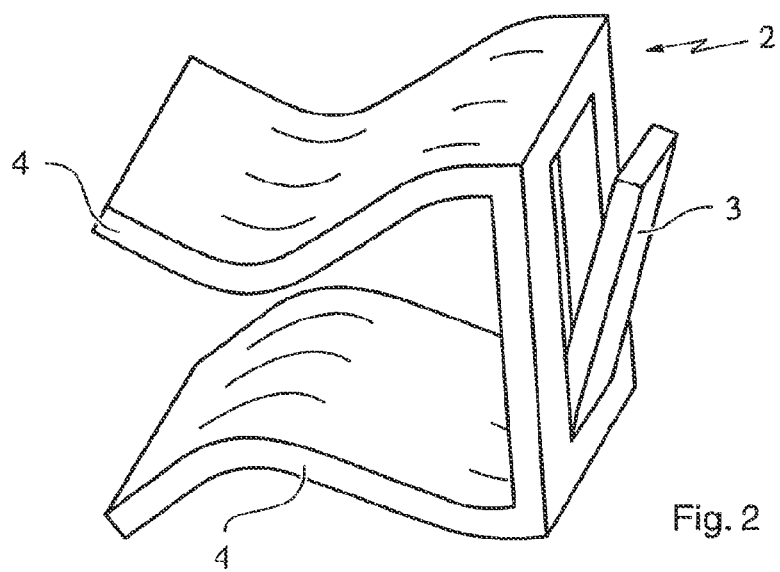

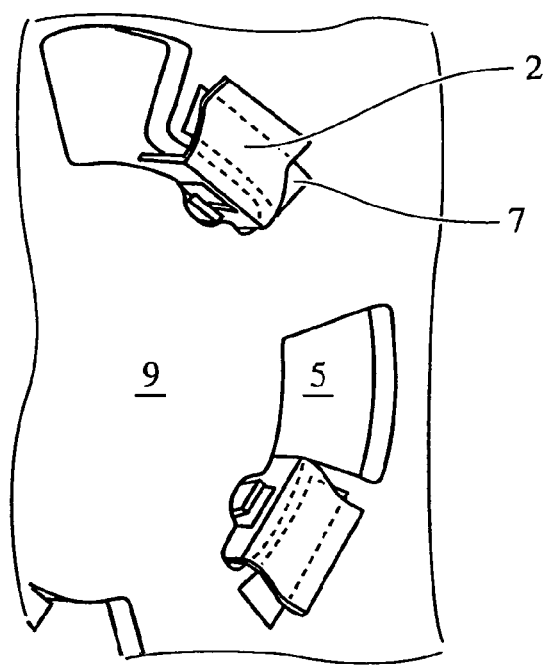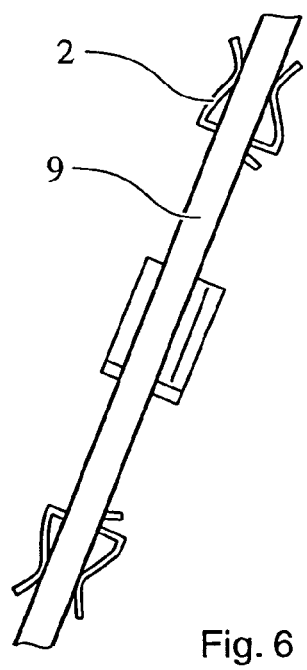
Fig. 5
Fig. 6

DEVICE FOR THE CONTACT AND ATTACHMENT OF AN ELECTRIC COMPONENT IN A MOTOR VEHICLE

CROSS REFERENCE TO RELATED APPLICATIONS

This application claims priority from and the benefit of PCT Application No. PCT/EP2008/002631, filed on Apr. 2, 2008; and German Patent DE 10 2007 016 166.4, filed on Apr. 2, 2007; all entitled "Device for the Contact and Attachment of an Electric Component in a Motor Vehicle", which are herein incorporated by reference.

BACKGROUND

The present invention relates to a device for the contact and attachment of an electric component, preferably in a motor vehicle, in a substantially flat region of a support element. The invention relates, in particular, to a contact-making device for use in motor vehicle construction, with which a component can be connected both mechanically and electrically to its support base in one working step, with the manner of operation of the device following the bayonet principle, for example.

Devices of this generic type are known, inter alia, in the case of motor vehicles for use with parts which are subject to wear and are likely to need to be replaced over the service life of the vehicle. This applies, for example, to bulbs used in rear lamps, which bulbs are equipped with a bayonet-type cap so that they can be replaced with little outlay and without tools. Furthermore, document DE 101 44 549 C1 discloses an arrangement comprising a steering wheel and a torsion module, in which, however, the primary aim is to simplify installation and not to attach and establish contact with an electric component. Furthermore, document DE 10 2005 046 545 A1 discloses a signaling device, in particular a signaling column, in which, however, an electrical core component which can be mounted on a support element from one side is not provided.

SUMMARY

The object is therefore to provide a device for the contact and attachment of an electric component in a substantially flat region of a support element, which device can be realized in a cost-effective manner, with sufficient robustness and sufficient reliability over a predefined service life, and in particular can be used in a standardized manner, that is to say for a large number of variants of such contact-making and attachment situations.

The object is achieved by a device for the contact and attachment of an electric component, in particular in a motor vehicle, in a substantially flat region of the support element, with the device having a large number of clips, and with one side of the clips being intended to be at least partially inserted into at least one recess in the support element. As a result, it is advantageously particularly possible, according to the invention, for a number of discrete or integrated components to be attached, for example to a printed circuit board or board, by means of soldering, and an electric component—for example an electric motor or the like—which is large and/or heavy (compared to the soldered-on structural elements) to be attached and contact to be made as required (to fulfill their actual function) without soldering and, in spite of this, it being possible for the electric component on the one hand and the printed circuit board or the other components of the printed circuit board on the other hand to be reliably mechanically connected and for reliable electrical contact between the two to be established.

Therefore, the invention proposes a device which provides rapid and uncomplicated mounting even for applications such as those above. In this case, replacement of the component is of low priority; simplified handling of the support base is the main concern. The invention is directed, in particular but not exclusively, at mounting an electric motor on a base board for installation into a motor vehicle display instrument, with the electric motor serving, for example, to drive a pointer. Compared to the other parts, such as ICs, LEDs, resistors etc., which are installed on a base board of this type, the electric motor is comparatively bulky. It is therefore desirable to be able to connect this component to the board separately from the other parts which are generally attached using a common soldering process. According to the invention, this can be performed, for example, without tools. To this end, the electric component has, according to a preferred embodiment, a preferably circular base which supports a plurality of clips which are roughly U-shaped in cross section and which are distributed, in particular uniformly, over a circular periphery or else (for example in order to prevent incorrect mounting or to guarantee a strict installation position) are fixed just non-uniformly to the base. These clips establish mechanical and, at the same time, electric contact with contact tongues which are formed by cutouts in the base structure by, for example, the base, in accordance with the bayonet principle, first being moved toward the base structure in a translatory manner and then being rotated, as a result of which all the clips at the same time move from a first position, in which they enter the base structure by entering recesses, to a second position in the same plane, relative to the base structure, and in the process surround the contact tongues. On account of the restoring forces which are introduced into the clips, which are provided with a spring action, by the surrounding process, a contact-pressure force is created, this contact-pressure force ensuring reliable electrical connection, with the clips preferably being formed from metal, as a result of which each clip can provide electrical contact-connection but does not have to if this is not necessary. It is therefore preferred, according to the invention, in order to attach the electric component to the support element and to establish contact between the electric component and the support element, to provide a first relative movement between the electric component and the support element substantially parallel to the surface normal of the substantially flat region of the support element, and to preferably provide a second relative movement substantially parallel to the flat region of the support element, with the second relative movement preferably being provided in the form of a rotary movement. As a result, the discussed bayonet attachment processes are possible. However, it is also possible, according to the invention, for the relative movement between the electric component and the support element to not be a rotary movement but rather, for example, substantially a translatory movement (specifically, for example, if the entire electric component is displaced parallel to the support element relative to the support element).

It is further preferred, according to the invention, for latching to be provided by means of at least one latching element after the first and the second relative movement between the electric component and the support element have taken place. In a preferred embodiment, this results in the need for a latching projection from the clip form, said latching projection interacting with a small recess in the base structure or the support element, in the region of the shoulder of at least one of the clips, as a result of which locking against reversal of the rotary movement (or the second relative movement) is provided. Therefore, automatic release of the attachment due to vibrations during operation of the vehicle is reliably prevented.

It is also further preferred, according to the invention, for each clip to have an associated recess or for the clips to have one shoulder and two limbs or for the limbs to be provided in corrugated form. As a result, it is advantageously possible, according to the invention, to largely reduce the reduction in the stability of the support element due to the recesses (because, rather than a recess which is large and therefore reduces the stability to a great extent in many cases, a plurality of recesses which do not substantially reduce the stability of the support element are provided), and for the clips to be able to reliably ensure both the mechanical and also the electrical connection of the electric component to the support element.

Furthermore, it is also preferred, according to the invention, for at least one of the limbs of at least one of the clips to be provided for establishing contact with and/or for attachment to a contact tongue which is formed on the support element. Within the scope of the present invention, substantially a material region of the support element which is directly intended to provide mechanical connection to the clips is designated a contact tongue. The region of the support element which is surrounded by the clips with a clamping fit, for example, corresponds to a material region of the above type. Sound contact-connection or electrical connection is ensured in the case of the device according to the present invention in particular by it being possible to also provide a contact area in the region of the contact tongue, so that, for example, reliable contact-connection is possible by virtue of the discussed clamping fit.

Furthermore, it is also preferred, according to the invention, for the second relative movement to correspond to at least partial insertion of the contact tongue between the limbs of the clip, or for this insertion to be provided substantially perpendicular to the direction of extent of the limbs, starting from the shoulder of the clip, or else to be provided substantially parallel to the direction of extent of the limbs, starting from the shoulder of the clip. As a result, advantageous configurations can be realized in each case. For example, the clips could also run in a wedge-like manner in the event of insertion substantially perpendicular to the direction of extent of the limbs, starting from the shoulder of the clip, so that the contact tongue is reliably grasped by the clip.

DRAWINGS

The figures present an embodiment of the invention by way of example and in a schematic form.

FIG. 1 schematically shows an exemplary embodiment of a mounting face of an electric component.

FIG. 2 schematically shows an enlarged perspective illustration of a clip of the device according to the invention.

FIGS. 3 to 6 show various partially perspective and partially enlarged illustrations of the electric component which is connected to the support element.

DETAILED DESCRIPTION

FIG. 1 schematically shows a device 12 for the contact and attachment of an electric component 1 (e.g., an electric motor), in particular for a motor vehicle 10, to a support element. As illustrated, the electrical component 1 includes a component base 11 having a mounting face with, in the exemplary embodiment, clips 2 attached to it.

FIG. 2 schematically shows a perspective illustration of one of the clips 2 (in a separate illustration), said figure showing a latching projection 3 together with a corrugated contour of the clip limbs 4 which is advantageous for the spring action of the clip. Provision is made, according to the invention, for a contact tongue 6 (cf. FIG. 3 for example) to be inserted between the limbs 4 of the clip 2. This produces a clamping fit on account of the spring action of the limbs 4, said clamping fit enabling firstly sound mechanical connection and secondly sound electrical connection (if this is desired in the case of a given clip). In this case, the insertion of the contact tongue between the limbs of the clip corresponds substantially to insertion perpendicular to the direction of extent of the limbs, starting from the shoulder of the clip (that is to say substantially parallel to the extent of the shoulder of the clip). Provision may be made, according to the invention, for that end of the limb 4 which is at the front (in the insertion direction) to be bent upward to some extent or for the clip to run in a substantially wedge-like manner, so that it does not catch during the connection movement.

FIG. 3 shows the device after the joining movement is concluded; in this case, the clips are seated fully on the contact tongues 6. The component 1 (not shown in FIG. 3) is connected both mechanically and electrically to a support element 9. The latching projections 3 engage with small recesses 8 and as a result prevent the electric component 1 from being detached from the support element 9.

Figure 4:
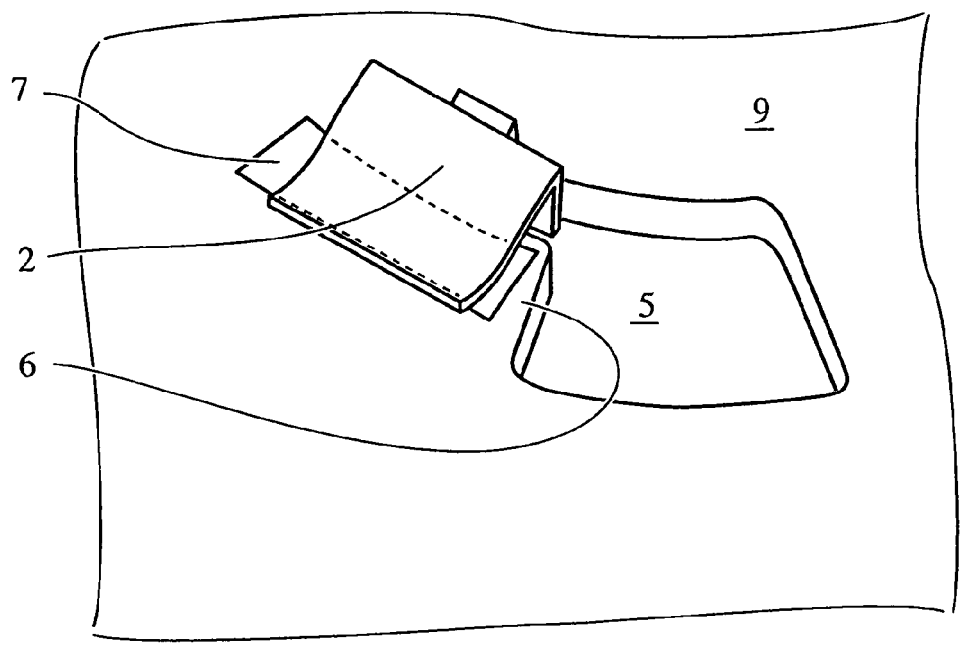

FIG. 4 shows an enlarged view of a detail from FIG. 3. It shows the base structure with a recess 5 for fitting the clip 2 in the first phase of the joining movement (in the manner of a bayonet in the illustrated exemplary embodiment). An electrically conductive contact area 7 is applied to the surface of the contact tongue 6, said contact area serving to electrically connect and therefore establish contact initially between the support element 9 and the clip 2. For its part, the clip 2 is connected to corresponding contact points of the electric component 1—for example an electric motor—, but this has not been illustrated in the figures for the sake of simplicity.

The invention claimed is:

1. A device for the contact and attachment of an electric component of a motor vehicle to a substantially flat region of a support element, the device comprising a plurality of clips arranged in a substantially circular pattern, wherein one side of each of the plurality of clips is configured to be at least partially inserted into at least one recess in the support element, each of the plurality of clips extends from the electric component, each of the plurality of clips is configured to establish contact between the electric component and the support element through a first relative movement in a direction substantially perpendicular to the substantially flat region of the support element, and a second relative movement in a direction substantially parallel to the substantially flat region of the support element, the second relative movement comprises a rotary movement, each of the plurality of clips comprises a corresponding recess through which a respective contact tongue of the support element is configured to be inserted to establish a mechanical connection with each respective contact tongue, each of the plurality of clips comprises limbs positioned on opposing sides of the corresponding recess through which the respective contact tongue of the support element is configured to be inserted, the limbs of each of the plurality of clips are configured to be positioned on opposing sides of the at least one recess in the support element and to contact opposing sides of the respective contact tongue, and at least one limb of at least one clip is configured to establish electrical contact with a conductive contact area on at least one side of the respective contact tongue.

2. The device as claimed in claim 1, comprising at least one latching element effective after the first and the second relative movement between the electric component and the support element have taken place.

3. The device as claimed in claim 1, wherein each of the plurality of clips comprises a shoulder extending between the limbs.

4. The device as claimed in claim 1, wherein the limbs are provided in corrugated form.

5. The device as claimed in claim 1, wherein the second relative movement corresponds to at least partial disposition of the limbs of each of the plurality of clips about each respective contact tongue.

6. The device as claimed in claim 1, wherein the limbs of at least one of the plurality of clips contact the respective contact tongue substantially along an axis perpendicular to a direction of extent of the limbs, starting from a shoulder of the at least one clip.

7. The device as claimed in claim 1, wherein the electrical component comprises an electric motor.

8. The device as claimed in claim 1, wherein the plurality of clips comprises at least three clips.

\* \* \* \* \*